United States Patent
Branham

(10) Patent No.: US 8,357,444 B2
(45) Date of Patent: Jan. 22, 2013

(54) VISUAL EFFECTS SCREEN

(76) Inventor: Michael James Branham, Vancouver (CA)

(*) Notice: Subject to any disclaimer, the term of this patent is extended or adjusted under 35 U.S.C. 154(b) by 354 days.

(21) Appl. No.: 12/556,348

(22) Filed: Sep. 9, 2009

(65) Prior Publication Data

US 2010/0066753 A1 Mar. 18, 2010

Related U.S. Application Data

(60) Provisional application No. 61/095,583, filed on Sep. 9, 2008.

(51) Int. Cl.
  *B32B 3/14* (2006.01)
  *B32B 3/06* (2006.01)
  *B32B 9/04* (2006.01)
  *B44C 1/26* (2006.01)
  *D06N 7/04* (2006.01)
  *B41M 5/00* (2006.01)

(52) U.S. Cl. ............ 428/67; 428/47; 428/101; 428/141; 428/195.1; 428/221; 428/409; 428/411.1; 428/542.6

(58) Field of Classification Search .................. None
See application file for complete search history.

(56) References Cited

U.S. PATENT DOCUMENTS

| | | | | |
|---|---|---|---|---|
| 5,737,031 A | * | 4/1998 | Tzidon et al. | 348/587 |
| 5,897,413 A | * | 4/1999 | Erland | 442/130 |
| 5,972,440 A | * | 10/1999 | Erland | 428/33 |
| 6,556,722 B1 | * | 4/2003 | Russell et al. | 382/291 |
| 2004/0183798 A1 | * | 9/2004 | Clavadetscher | 345/427 |

OTHER PUBLICATIONS

Tim Dobbert, "Tutorials/Tips & Tricks: The rules of camera tracking", 3D World, Dec. 2005, pp. 58-61.*

* cited by examiner

*Primary Examiner* — Maria Veronica Ewald
*Assistant Examiner* — Nicole T Gugliotta
(74) *Attorney, Agent, or Firm* — Island IP Law; Stephen R. Burri

(57) ABSTRACT

There is provided a special effects greenscreen having a plurality of marks dispersed thereon in a selected pattern, wherein each of the marks is embedded in the greenscreen by weaving, knitting, felting, crocheting, screening, stamping, embossing or similar method to integrate the mark into the greenscreen material. The pattern may be a single repeated mark evenly spaced along horizontal lines, along vertical lines, or along both horizontal and vertical lines. The pattern may comprise a familiar ordered series of unique marks dispersed in a selected pattern on the greenscreen, for example, letters of the alphabet. The pattern may comprise a first mark embedded at a selected point on the greenscreen, a plurality of second marks each embedded a first distance away from the first mark, and a plurality of third marks each embedded a second distance from the first mark, wherein the second distance is greater than first distance.

12 Claims, 3 Drawing Sheets

VISUAL EFFECTS SCREEN

FIELD OF THE INVENTION

The present invention relates to special effects for film and television. In particular, the invention relates to compositing using background screens, a process commonly known as "blue-screen" technology.

BACKGROUND OF THE INVENTION

In this specification, the various terms in use for the film making techniques commonly referred to as "blue-screen", "greenscreen", "blue screen chroma-keying", "greenscreen chroma-keying", "traveling matte composite", "keying", and similar terms, will be referred to hereafter as "keying".

Keying technology is well known in the prior art. It is a filmmaking technique whereby actors or other subjects are filmed acting a scene in front of an evenly lit, monochromatic background surface to produce an initial image. The background surface will be referred to as a "greenscreen". The term "film" will be used to mean "film", "videotape", "digitally capture", "record" and similar terms used to describe recording of audiovisual data onto media. The background surface is commonly blue or green, but may also be red, magenta, or another color.

In post-production processing, the monochromatic background in the intended image is replaced through keying, a process in which a single color or a narrow range of colors from one image, for example the background screen color, is removed to reveal another image behind. This allows other film footage or computer generated imagery ("CGI") to form the final background imagery used in the finished product, namely, the final film as it is intended to be seen by the viewing audience. Note that the term "background" is used to mean the area of the original image which is to be replaced, regardless of whether such area forms the background in the final product. The imagery used to replace the monochromatic background may comprise a photograph, video, or other visual content.

This keying process is commonly used in the film industry to enable an actor to appear in scenes which would otherwise be impossible, extremely difficult or very costly to obtain. For a blue screen, whatever appears in a scene that is colored blue is replaced by an image from another camera, usually taken at a different time and location, to create a composite image. Examples of scenes in which keying might be used may include scenes of a climber on Mt. Everest, a superhero flying through the air carrying a full sized school bus full of children, an astronaut floating in space, or a long destroyed ancient Roman city seemingly rebuilt in Europe.

For a large budget motion picture, a production company may require a department made up of 200 to 500 people employed as CGI artists working in a facility known as a rendering farm to create the CGI background and CGI elements that most modern motion pictures and production companies rely on to create the amazing sequences that audiences now consider essential in modern films.

Commonly, the greenscreen used in the film industry is a fabric or other material of a solid color. The fabric or other material may be comprised of a natural fibre, a synthetic, or a combination. In order to facilitate the work of the CGI artists, reference markings are desirable on the greenscreen. In the past, such markings have been painted on, obtained with pieces of adhesive tape, or comprised small objects affixed to the greenscreen with pins or other fastening means. These methods of marking present several disadvantages.

These disadvantages include destruction of the greenscreen through puncture, tape residue or paint markings, rendering the greenscreen unfit for reuse. Also, these techniques provide markings with irregular borders, resulting in less than optimal keying in post production.

SUMMARY OF THE INVENTION

According to one of its aspects, there is provided a special effects greenscreen having a plurality of marks dispersed thereon in a selected pattern, wherein each of the marks is embedded in the greenscreen. Each mark may be embedded by a process selected from the group of embedding processes comprising: weaving, knitting, felting, crocheting, screening, stamping, and embossing, or similar method to integrate the marks into the material of the greenscreen.

The pattern may comprise a single repeated mark evenly spaced along horizontal lines, along vertical lines, or along both horizontal and vertical lines. The distance between each pair of marks along the horizontal lines may be approximately 2 feet. The distance between each pair of marks along the vertical lines may be approximately 2 feet.

In one embodiment, the pattern may comprise a familiar ordered series of unique marks dispersed in a selected pattern on the greenscreen. The familiar ordered series may comprise the letters of an alphabet, or a series of sequential numbers.

In another embodiment, the pattern may comprise a first mark embedded at a selected point on the greenscreen, and a plurality of second marks each embedded a first distance away from the first mark. A plurality of third marks may each be embedded a second distance from first mark, wherein the second distance is greater than first distance.

The color of the marks may be a lighter or darker shade of the same color as the greenscreen. Preferably, the color of each mark will be CGI keyable relative to the color of the greenscreen.

The greenscreen may be composed of a material selected from the group of materials comprising: a natural fiber material, a synthetic material, or a combination of natural fiber and synthetic materials.

According to another of its aspects, there is provided use of a special effects greenscreen to add, adjust and move a CGI background in post-production special effects film processing using reference marks on a greenscreen, wherein the reference marks are embedded in the greenscreen.

According to yet another of its aspects, there is further provided a method of preparing a special effects greenscreen comprising embedding a plurality of marks in the greenscreen by a process selected from the group of embedding processes comprising: weaving, knitting, felting, crocheting, screening, stamping, and embossing.

According to still another of its aspects, there is also provided a method of adding, adjusting and moving a CGI background in post-production special effects film processing using reference marks on a greenscreen, wherein the reference marks are embedded in the greenscreen.

BRIEF DESCRIPTION OF THE DRAWINGS

A detailed description of the preferred embodiments is provided below by way of example only and with reference to the following drawings, in which.

Figure 1:
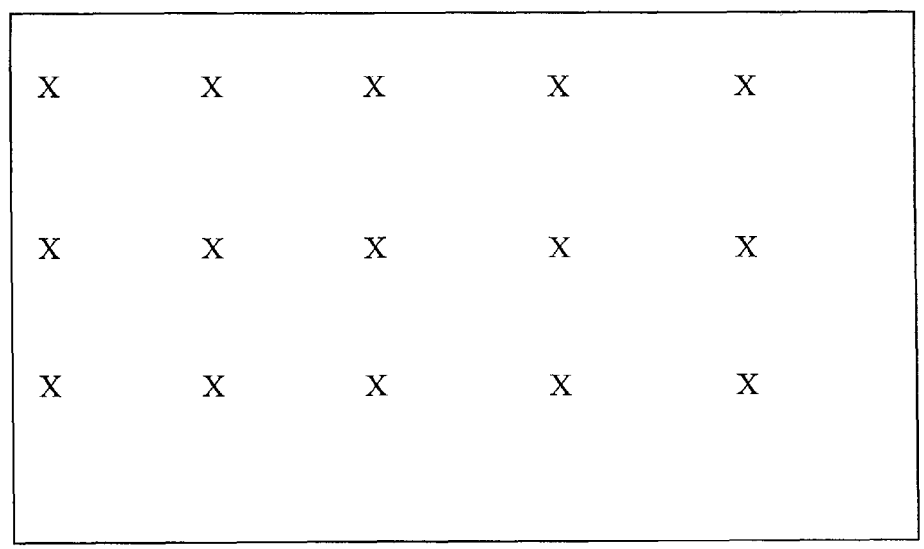
FIG. 1 is a front planar view of a first pattern of repetitive reference markings on a greenscreen of the present invention.

In the drawings, one embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE INVENTION

In the following detailed description of the preferred embodiment, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that structural, logical, physical, architectural, and electrical changes may be made without departing from the spirit and scope of the present invention. The following detailed description is, therefore, not to be taken in a limiting sense, and the scope of the present invention is defined only by the appended claims and their equivalents.

In the following detailed description of the invention, reference numerals are used to identify structural elements, portions of elements, or surfaces in the drawings, as such elements, portions or surfaces may be further described or explained by the entire written specification. For consistency, whenever the same numeral is used in different drawings, it indicates the same element, portion, surface and area as when first used. It should be understood that only those components having particular functional importance or that would not otherwise be identified have been assigned reference numerals.

According to the present invention, a greenscreen may be provided with permanent, keyable, colored marks embedded into the fabric by way of weaving, knitting, felting, crocheting, screening, stamping, embossing, or any other method during manufacture. The marks would be precisely located in selected desirable locations within the fabric or other material of the greenscreen.

The marks may comprise a pattern, such as a grid comprising a plurality of X's spaced evenly along horizontal and vertical lines, as depicted in FIG. 1. Other repeating letters, numbers, or symbols may also be used. The distance between each mark in a horizontal line may be 2 feet or other selected distance. The distance between each mark in a vertical line may be 2 feet or other selected distance.

Figure 2:
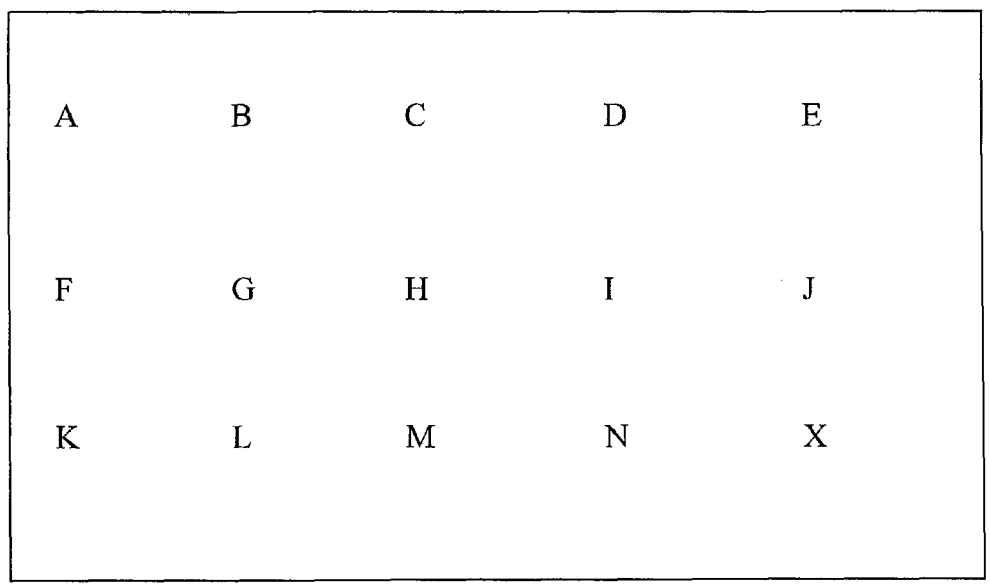
FIG. 2 is front planar view of a second pattern of sequential reference marking on a greenscreen of the present invention.
Figure 3:
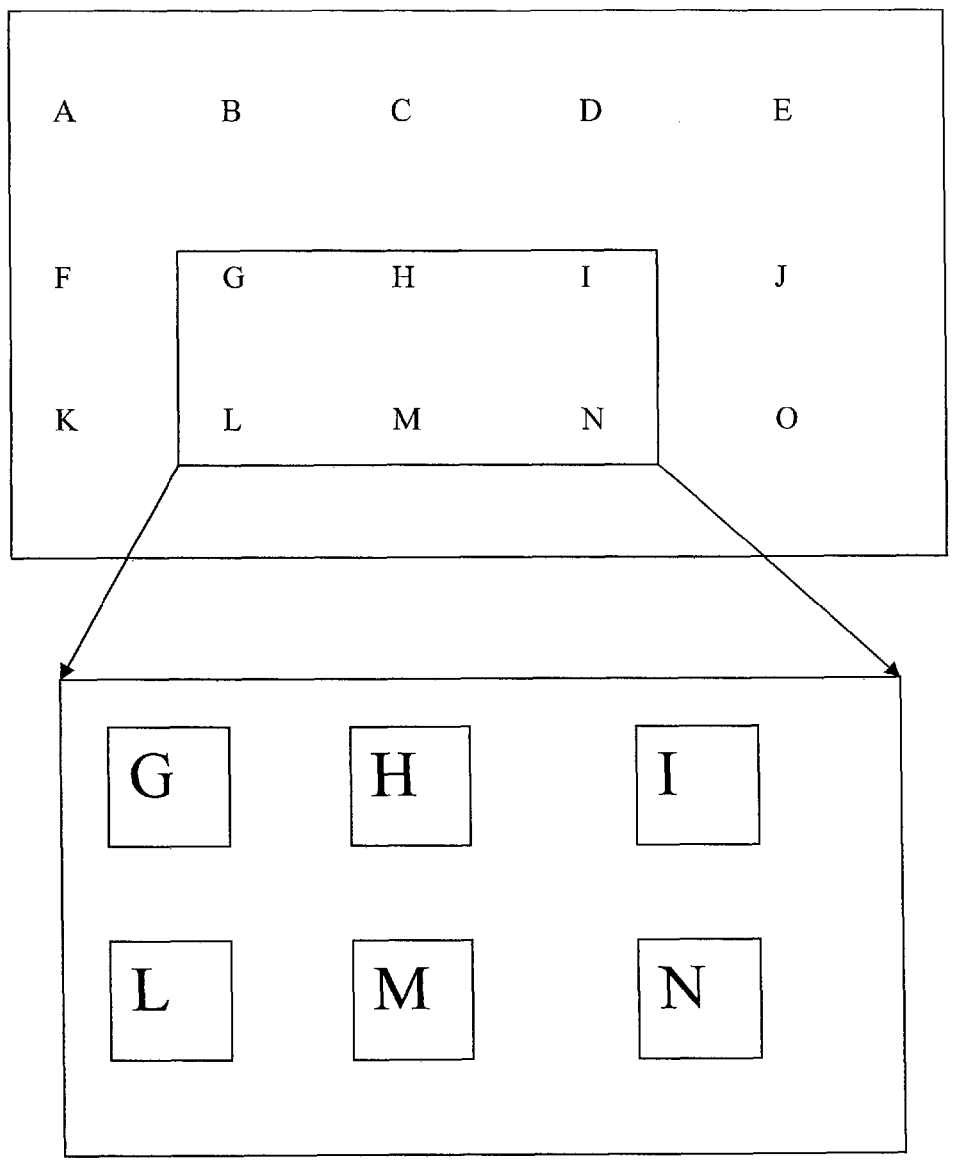
FIG. 3 is an exploded view of a portion of the greenscreen of FIG. 2, according to the invention.

Alternatively, the marks may comprise a series of numbers, letters or other symbols located in the greenscreen fabric in a selected spacing pattern displayed and viewable across the expanse of the greenscreen. For example, the letters of the alphabet may be embedded in the greenscreen, as shown in FIGS. 2 and 3. As each mark in the greenscreen will be unique, a CGI artist will be able to orient their work, whether working on a zoomed-in frame, a frame as shot, or some other perspective.

In another embodiment, a regular or irregular pattern of marks may be used in relation to a point of interest in the image. For example, the centre of the frame may be marked with a first symbol. A second symbol may be embedded in several positions equidistant from the first symbol. A third may be placed in several positions further out, and so on. Other patterns are also possible.

The density of the marks may be 1 mark per 2 square feet of fabric surface area, 2 marks for every 1 square foot of fabric surface area, or such other spacing density as is considered optimal for the particular circumstances. Spacing density may depend on several factors, including the anticipated CGI background imagery, the subject actor, other objects in the scene, and other factors. The marks are located across the greenscreen surface in a regular and precisely spaced pattern to serve as reference points.

The color of the embedded greenscreen marks would be selected to be selected to be clearly distinguishable from the background color, but would itself be keyable. Typically, a green would be used in for green greenscreens, blue in blue greenscreens, etc., as this would allow them to be easily removed from the initial image with the keying process. The resulting reference points, grid pattern or repeating pattern may be used as a point of reference for plotting and drawing, as starting points for addition of CGI background elements, art work, and architecture.

The precise spatial reference provided by the embedded marks for use in designing, building, plotting, drawing, mapping and creating CGI backgrounds cannot be duplicated by last minute prior art techniques involving painting on of reference marks, or application of strips of adhesive tape during filming. With the embedded, keyable greenscreen marks in place a CGI artist will know that the marks are evenly spaced and can be used as a consistent reference point when zoomed in on in any given frame, as depicted in FIG. 3, as the greenscreen background of any practical frame magnification would contain a sufficient distribution of marks that the portion of the greenscreen within the zoomed in frame would contain detectable embedded marks.

A CGI artist may use the embedded greenscreen tracking marks to adjust the position and movement of the CGI background in order to make it match and to counter any movement of the foreground object seamlessly, creating the illusion that the CGI is real and indistinguishable from the actual live footage originally shot on greenscreen with the embedded tracking marks.

As the reference marks do not damage the greenscreen, the same greenscreen may be reused for multiple scenes or projects. Also, the marks may be manufactured to have clean borders, permitting optimal keying. Adhesive tape strips, painting, and similar prior art procedures will not produce clean borders, resulting in less efficient CGI work.

Both on set and in post-production, the embedded greenscreen marks would permit a reduction in professional time and a savings in production costs. In particular, use of the embedded marks would save thousands of hours and hundreds of thousands of dollars of CGI artists work, as each time an artist is required to zoom in or out on a frame or image to check orientation, camera position, or other parameter, additional time is spent on the film project.

Movies are traditionally filmed at a rate of 24 frames per second, a frame essentially being a single photograph of the action of the scene. A minute of film footage produces 1440 individual frames or images. Typically, a movie crew may film 20 minutes, or 28,800 frames in one day. The result is a significant amount of film footage for each CUT artist at a rendering farm to work with. As large budget productions may employ 200 to 500 CGI artists, each working very long hours for an average of at least three months, the cost savings resulting from an increase in the efficiency of the CGI artists work, as a result of use of the greenscreen of the present invention, would be very substantial.

In the modern film industry, visual effects (Visfx) are considered standard. As Visfx production houses and rendering farms are constantly required to increase output with fewer resources, the improved greenscreen of the present invention is a valuable tool for the film industry that will permit savings of time and money.

What is claimed is:

1. A unitary, reusable special effects greenscreen having a plurality of marks dispersed thereon in a selected pattern, wherein each of the marks is embedded in the greenscreen wherein each mark is embedded by a process selected from the group of embedding processes comprising: weaving, knitting, felting, crocheting, stamping, and embossing.

2. The special effects greenscreen of claim 1 wherein the pattern comprises a single repeated mark evenly spaced along horizontal lines.

3. The special effects greenscreen of claim 2 wherein the pattern further comprises the single repeated mark evenly spaced along vertical lines.

4. The special effects greenscreen of claim 1 wherein the pattern comprises an ordered series of unique marks dispersed in a selected pattern on the greenscreen.

5. The special effects greenscreen of claim 4 wherein the ordered series comprises the letters of an alphabet.

6. The special effects greenscreen of claim 4 wherein the ordered series comprises a series of sequential numbers.

7. The special effects greenscreen of claim 1 wherein the pattern comprises a first mark embedded at a selected point on the greenscreen, and a plurality of second marks each embedded a first distance away from the first mark.

8. The special effects greenscreen of claim 7 further comprising a plurality of third marks each embedded a second distance from first mark, wherein second distance is greater than first distance.

9. The special effects greenscreen of claim 1 wherein the color of the marks is a lighter or darker shade of the same color as the greenscreen.

10. The special effects greenscreen of claim 9 wherein the color of each mark is CGI keyable relative to the color of the greenscreen.

11. The special effects greenscreen of claim 1, wherein the greenscreen is composed of a material selected from the group of materials comprising: a natural fiber material, or a combination of natural fiber and synthetic materials.

12. A method of adding, adjusting and moving a CGI background in post-production special effects film processing using reference marks on a greenscreen, wherein the reference marks are embedded in the greenscreen by a process selected from the group of embedding processes comprising: weaving, knitting, felting, crocheting, stamping, and embossing.

* * * * *